United States Patent
Wang et al.

(10) Patent No.: US 8,348,206 B2
(45) Date of Patent: Jan. 8, 2013

(54) ELECTRONIC DEVICE

(75) Inventors: Jin-Xin Wang, Shenzhen (CN); Chao-Zhong Fu, Shenzhen (CN); Jian Li, Shenzhen (CN); Li-Jun Yuan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 901 days.

(21) Appl. No.: 12/335,617

(22) Filed: Dec. 16, 2008

(65) Prior Publication Data

US 2010/0050383 A1  Mar. 4, 2010

(30) Foreign Application Priority Data

Aug. 29, 2008 (CN) .......................... 2008 1 0304310

(51) Int. Cl.
*F16M 11/00* (2006.01)
(52) U.S. Cl. .................. 248/176.1; 248/176.3; 248/371; 248/142; 248/222.11; 248/309.1; 16/343
(58) Field of Classification Search ............... 248/176.1, 248/176.3, 133, 454, 122.1, 371, 372.1, 292.13, 248/291.1, 917, 918, 142, 222.11, 222.12, 248/920, 922, 923, 274.1, 309.1; 16/321, 16/342, 340, 328, 330, 336, 337; 261/679.01; 361/679.01, 679.02, 679.43
See application file for complete search history.

(56) References Cited

U.S. PATENT DOCUMENTS

| 6,532,628 | B2 * | 3/2003 | Kim ................................. 16/342 |
| 6,698,063 | B2 * | 3/2004 | Kim et al. ........................ 16/337 |
| 6,796,541 | B2 * | 9/2004 | Lu ............................... 248/291.1 |
| 6,899,311 | B1 * | 5/2005 | Ternus .......................... 248/454 |
| 7,232,098 | B2 * | 6/2007 | Rawlings et al. ............. 248/121 |
| 7,413,152 | B1 * | 8/2008 | Chen ........................... 248/176.1 |
| 7,421,762 | B2 * | 9/2008 | Lu et al. ........................... 16/328 |
| 7,513,011 | B2 * | 4/2009 | Lu et al. ........................... 16/337 |
| D598,445 | S  * | 8/2009 | Pan et al. ...................... D14/336 |
| 7,735,797 | B2 * | 6/2010 | Hu ................................ 248/371 |
| 7,762,518 | B2 * | 7/2010 | Ogawa et al. ................. 248/688 |
| 7,841,567 | B2 * | 11/2010 | Wang ............................ 248/136 |
| 7,866,615 | B2 * | 1/2011 | Hsuan et al. ............... 248/188.8 |
| 8,074,956 | B2 * | 12/2011 | Wang et al. ................... 248/688 |
| 8,205,842 | B2 * | 6/2012 | Wang et al. ................ 248/176.3 |

FOREIGN PATENT DOCUMENTS

| CN | 2531429 Y | 1/2003 |
| TW | 374744 | 11/1999 |
| TW | M266685 | 6/2005 |
| TW | 200735658 A | 9/2007 |
| TW | M333751 | 6/2008 |

* cited by examiner

*Primary Examiner* — Todd M Epps
(74) *Attorney, Agent, or Firm* — Altis Law Group, Inc.

(57) ABSTRACT

An electronic device includes a frame having a protrusion, a support, and a hinge assembly. The hinge assembly rotatably connects the frame and the support. The hinge assembly includes an elastic member providing a force pulling the frame and the support to move towards each other. The protrusion of the frame and the support cooperatively support the electronic device on a surface.

11 Claims, 3 Drawing Sheets

ELECTRONIC DEVICE

BACKGROUND

1. Field of the Invention

The present disclosure generally relates to electronic devices and, particularly, to an electronic device with a rotatable display screen.

2. Description of the Related Art

Some electronic devices, such as liquid crystal displays (LCDs), are typically supported by stands. For example, an LCD usually includes a display screen, a hinge assembly, and a stand. The hinge assembly is positioned between the display screen and the stand. A viewing angle of a display screen of the LCD is adjustable relative to the stand, so that users can view the display screen from different positions.

The hinge assembly includes two components rotatable relative to each other. One component is connected to the display screen and the other component is connected to the stand. The hinge assembly and the display screen are both supported by the stand. An external force may be applied to the display screen, such that the display screen rotates relative to the stand to change the viewing angle.

However, if the display screen is rotated through a large angle, the center of gravity of the display screen may change. Thus, the display screen may fall over if the display screen is too heavy.

Therefore, a new electronic device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
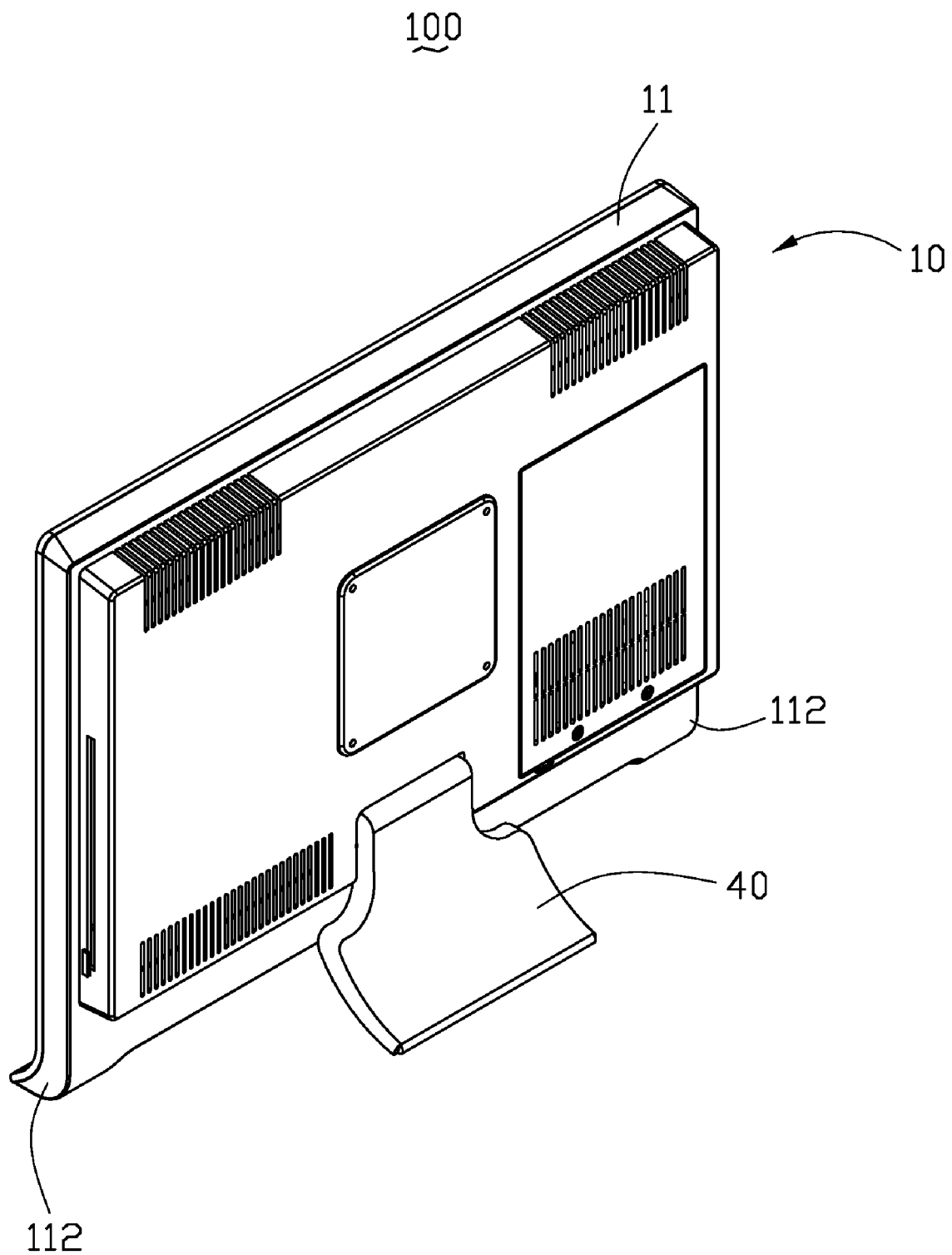
FIG. 1 is an assembled, isometric view of one embodiment of an electronic device, the electronic device including a display screen, a connecting member, a hinge assembly, and a support.

The present electronic device may be display devices and integral computers, such as computers with display screens and host computers positioned in an integrally frame, and so on. Referring to FIG. 1, for the purposes of conveniently describing the present electronic device, one embodiment of a display device 100 is described and illustrated.

Figure 2:
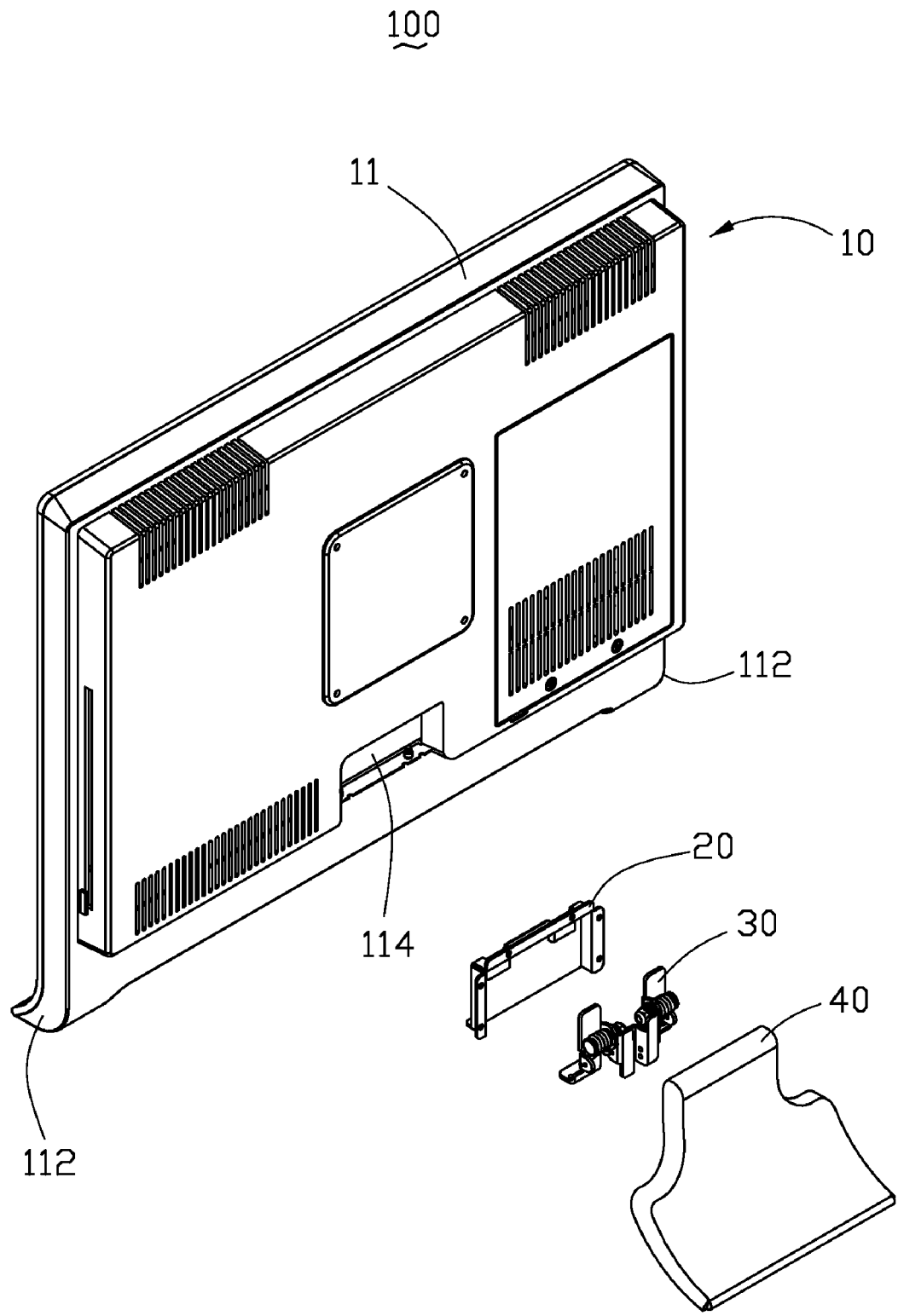
FIG. 2 is a partially exploded, isometric view of the electronic device of FIG. 1.

Referring also to FIG. 2, one embodiment of the display device 100 includes a display screen 10, a connecting member 20, a hinge assembly 30, and a support 40.

The display screen 10 includes a frame 11 and a display module (not shown) assembled in the frame 11. The frame 11 includes two elongated protrusions 112 formed at an edge of the frame 11. The protrusions 112 bend towards one side of the frame 11. The frame 11 further defines a receptacle 114 to receive the connecting member 20. The receptacle 114 is defined above a position between the protrusions 112.

Figure 3:
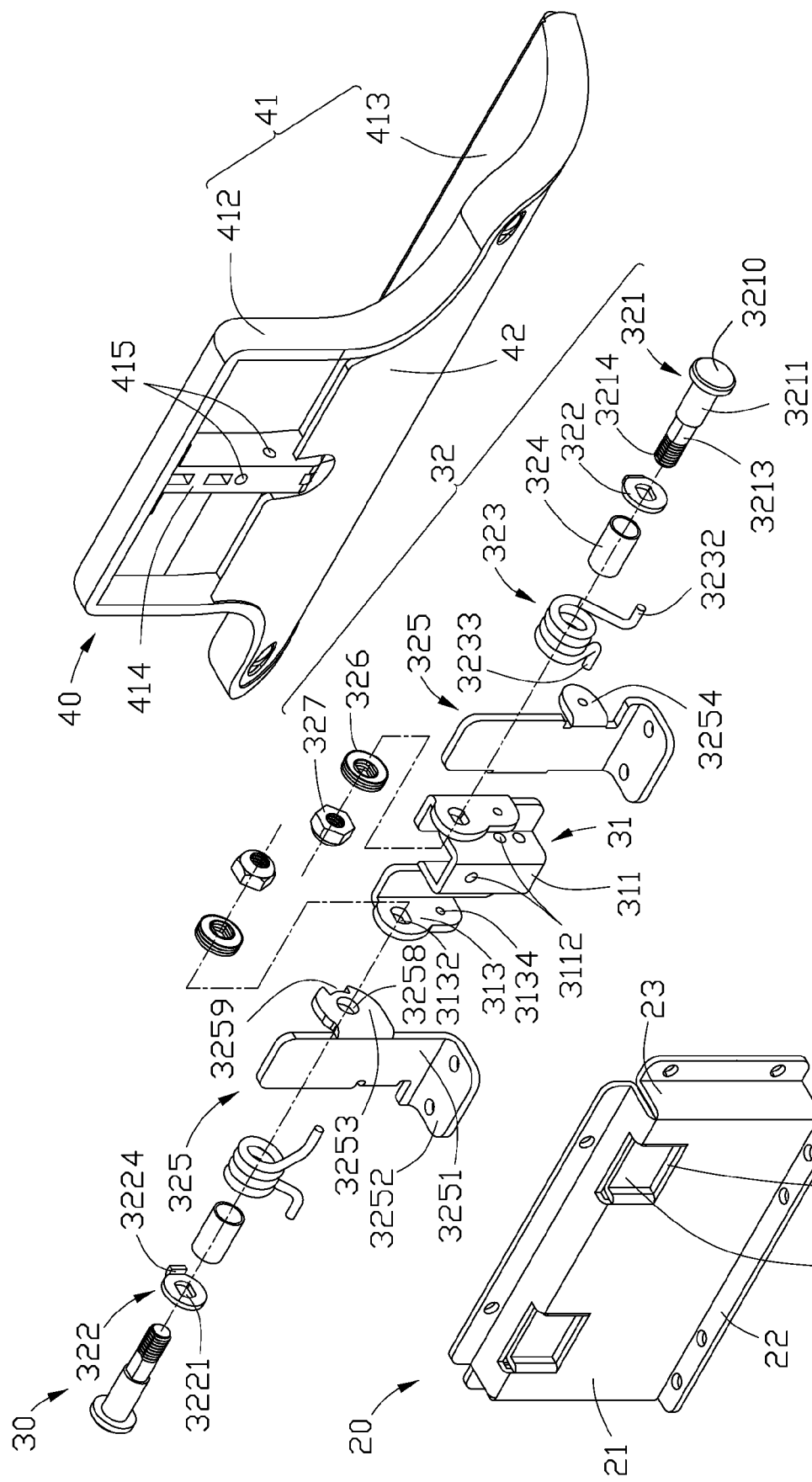
FIG. 3 is an exploded view of the connecting member, the hinge assembly, and the support of the electronic device of FIG. 1.

Referring to FIG. 3, the connecting member 20 includes a rectangular main sheet 21, a first connecting sheet 22, and three second connecting sheets 23. The first connecting sheet 22 and the second connecting sheets 23 extend perpendicularly from four sides of the main sheet 21. An extending direction of the first connecting sheet 22 is opposite to extending directions of the second connecting sheets 23. The first connecting sheet 22 and the second connecting sheets 23 define a plurality of connecting holes (not labeled). The main sheet 21 forms two latching portions 213 adjacent to an edge of the main sheet 21 opposite to the first connecting sheet 22. Each latching portion 213 includes a blocking wall 2133 and a latching slot 2132. Two ends of each blocking wall 2133 may be formed from the main sheet 21. A main portion of each blocking wall 2133 is spaced from the main sheet 21, thus defining the corresponding latching slot 2132. In another embodiment, the connecting member 20 and the frame 11 may be integrally formed.

The hinge assembly 30 includes a rotatable bracket 31 and two pivot units 32 positioned at opposite sides of the rotary bracket 31. Each pivot unit 32 includes a shaft 321, a limiting washer 322, a torsion elastic member 323, a tube 324, a connecting bracket 325, a resilient member 326, and a fastening member 327. In another embodiment, the hinge assembly 30 may include only one pivot unit 32.

The rotary bracket 31 includes a main body 311, and two assembling portions 313 formed at opposite sides of the main body 311. Each assembling portion 313 defines a keyed hole 3132 and a positioning hole 3134. The keyed hole 3132 may be a non-circular hole. The main body 311 defines a plurality of assembling holes 3112 to fix the rotary bracket 31 to the support 40.

The shaft 321 includes a flange 3210, a first shaft portion 3211, and a second shaft portion 3213 having a diameter smaller than a diameter of the first shaft portion 3211. A threaded portion 3214 is formed at a distal end of the second shaft portion 3213. A cross-section of the second shaft portion 3213 corresponds to a shape of the keyed hole 3132.

The limiting washer 322 may be substantially ring shaped and defining a non-circular keyed hole 3221 in a center portion. A tab 3224 is formed at an edge of the limiting washer 322. In one embodiment, the torsion elastic member 323 is a torsion spring. The torsion elastic member 323 includes two positioning ends 3232, 3233. The tube 324 may be a hollow cylinder.

The connecting bracket 325 includes a base 3251, a bottom sheet 3252 extending substantially perpendicularly from an end of the base 3251, a restricting sheet 3253, and an ear 3254. The restricting sheet 3253 and the ear 3254 are substantially perpendicularly formed from opposite sides of the base 3251. The bottom sheet 3252 defines a plurality of assembling holes (not labeled). The restricting sheet 3253 defines a pivot hole 3258 and a cutout 3259 at an edge of the restricting sheet 3253. The ear 3254 defines a positioning hole (not labeled).

The resilient member 326 includes a plurality of resilient washers. The resilient member 326 provides an axial force. The resilient member 326 may be a helical spring or a rubber component, for example. In the illustrated embodiment, the fastening member 327 is a nut.

The support 40 includes an arched main frame 41 and an enhancing portion 42 to strengthen the support 40. The main frame 41 may be made of plastic and the enhancing portion 42 may be made of metal. The main frame 41 includes a connecting portion 412 and a supporting portion 413 slanted to the connecting portion 412. The connecting portion 412 forms an assembling portion 414. The assembling portion 414 defines a plurality of assembling holes 415.

The tubes 324 are sleeved on the first shaft portions 3211 of the shafts 321, and the torsion elastic members 323 are sleeved on the tubes 324. The second shaft portions 3213 of the shafts 321 are inserted into the keyed holes 3221 of the limiting washers 322, the pivot holes 3258 of the connecting brackets 325, the keyed holes 3132 of the rotary bracket 31, and the resilient members 326. The fastening members 327 are screwed on the threaded portion 3214 of the shafts 321. The positioning holes 3232, 3233 of each torsion elastic member 323 are fixed in a corresponding positioning hole 3134 of the rotary bracket 31 and the positioning hole of a corresponding connecting bracket 325. The tab 3224 of each limiting washer 322 is rotatably engaged in the cutout 3259 of a corresponding connecting bracket 325. The resilient member 326 is compressed. The shafts 321, the rotary bracket 31, and the limiting washers 322 are non-rotatable to each other, and are rotatable relative to the connecting brackets 325. As such, the hinge assembly 30 is assembled.

The connecting member 20 is fixed to the frame 11 of the display screen 10. The rotary bracket 31 of the hinge assembly 30 is fixed to the assembling portion 412 of the support 40. The bases 3251 of the connecting brackets 325 are inserted in the latching slots 2132 of the latching portions 213 of the connecting member 20 from a bottom side and protrude out of the latching slots 2132 towards an upper side, and resist the blocking walls 2133. A plurality of screws are engaged in the connecting holes of the first connecting sheet 22 of the connecting member 20 and the bottom sheets 3252 of the connecting brackets 325. As such, the connecting brackets 325 are fixed to the connecting member 20. The supporting portion 413 of the support 40 and the protrusion 112 of the display screen 10 point towards opposite directions, thus forming an inverted "Y" shaped stand. When the display device 100 is placed on a surface, the supporting portion 413 of the support 40 and the protrusion 112 of the display screen 10 are supported by the surface. A viewing angle of the display screen 10 may be adjusted by applying an external force on a top edge of the frame 11, such that the rotary bracket 31 and the support 40 rotate relative to the frame 11, the connecting brackets 325, and the connecting member 20. The supporting portion 413 of the support 40 and the protrusions 112 of the display screen 10 move away from each other.

Since the supporting portion 413 of the support 40 and the protrusion 112 of the display screen 10 form an inverted "Y" shaped stand, a center of gravity of the display screen 10 will always be between the supporting portion 413 and the protrusion 112 at all display angles. In addition, in one embodiment, few screws are used to fix the connecting brackets 325 to the connecting member 20, because the bases 3251 of the connecting brackets 325 are engaged in the latching slots 2132 of the latching portions 213 of the connecting member 20. Therefore, assembling and disassembling the hinge assembly 30 and the support 40 to the display screen 10 is very simple and convenient.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
    a frame having a protrusion formed at an edge of the frame and bending towards a front side of the frame;
    a hinge assembly comprising a pivot unit, a connecting bracket fixed to the frame and a rotatable bracket rotatably assembled with the connecting bracket via the pivot unit;
    an arched support rotatably connected to the frame via the hinge assembly, the support comprising a connecting portion fixed to the rotatable bracket and a supporting portion slanted to the connecting portion along a direction away from the corresponding protrusion of the frame; and
    a connecting member fixed to the frame; the connecting member forms at least one latching portion for latching with the at least one connecting bracket to connect the connecting member and the at least one connecting bracket,
    wherein, the connecting bracket defines a pivot hole; the pivot unit comprises a shaft, a torsion elastic member, and a tube; the shaft passes through the tube, the pivot hole of the connecting bracket, and is fixed to the rotatable bracket; the connecting bracket is rotatably sleeved on the shaft, the torsion elastic member is sleeved on the tube and assembled between the rotatable bracket and the connecting bracket for providing a force pulling the frame and the support to move towards each other, wherein the protrusion of the frame and the support cooperatively support the electronic device on a surface.

2. The electronic device of claim 1, wherein the frame and the support cooperatively form an inverted "Y" shape; a center of gravity of the frame is between the support portion and the protrusion.

3. The electronic device of claim 1, wherein the elastic member is a torsion elastic member providing a torsion force between the frame and the support.

4. The electronic device of claim 1, wherein the at least one latching portion of the connecting member comprises a blocking wall and a latching slot; the at least one connecting bracket comprises a base; a part of the base is inserted in the latching slot and resists the blocking wall.

5. The electronic device of claim 1, wherein the frame defines a receptacle for receiving the connecting member.

6. The electronic device of claim 1, wherein the shaft comprises a flange, a first shaft portion, and a second shaft portion having a diameter smaller than a diameter of the first shaft portion, a threaded portion is formed at a distal end of the second shaft portion; the tube is sleeved on the first shaft portion of the shaft together with the torsion elastic member, the second shaft portion of the shaft is inserted into the limiting washer, the pivot hole of the connecting bracket, and the rotary bracket in that order; the hinge assembly further comprises a resilient member for providing an axial force, and a fastening member; the resilient member is sleeved on a distal end of the second shaft portion of the shaft; the fastening member is screwed on the threaded portion of the shaft.

7. The electronic device of claim 6, wherein the pivot unit of the hinge assembly further comprises a limiting washer sleeved on the shaft, the limiting washer is non-rotatable relative to the shaft; the limiting washer forms a tab at an edge; the connecting bracket defines a cutout at an edge to rotatably engage with the tab.

8. The electronic device of claim 6, wherein the elastic member has two positioning ends; the rotary bracket and the connecting bracket both define a positioning hole; the positioning ends of the elastic member are fixed in the positioning holes of the rotary bracket and the connecting bracket.

9. An electronic device, comprising:
    a frame having a protrusion formed at an edge of the frame and bending towards a front side of the frame;

an arched support comprising a connecting portion and a supporting portion slanted to the connecting portion along a direction away from the corresponding protrusion of the frame; and a hinge assembly comprising a rotatable bracket fixed to the connecting portion of the arched support and two pivot units positioned at opposite sides of the rotatable bracket thereby rotatably connecting the frame and the arched support together, each pivot unit comprising a shaft, a limiting washer, a torsion elastic member, a tube sleeved on the shaft, a connecting bracket fixed to the frame and a fastening member, the connecting bracket defining a pivot hole and a cutout, the shaft passing through the pivot hole of the connecting bracket and fixed to the rotatable bracket thereby hinging the connecting bracket and the rotatable bracket together, the connecting bracket rotatably sleeved on the shaft, the torsion elastic member being sleeved on the tube and positioned between the rotatable bracket and the connecting bracket for providing a torsion force between the frame and the support to move towards each other, wherein the limiting washer is non-rotatably sleeved on the shaft, and forms a tab at an edge thereof, the tab of the limiting washer is rotatably engaged in the cutout of the connecting bracket; the protrusion of the frame and the support cooperatively support the electronic device on a surface, the electronic device further comprising a connecting member fixed to the frame, the connecting member forming a latching portion for latching with the connecting bracket to connect the connecting member and the connecting bracket.

10. The electronic device of claim 9, wherein the frame and the support are rotatably connected to each other; the frame and the support cooperatively form an inverted "Y" shaped; a center of gravity of the frame is between the support portion and the protrusion.

11. The electronic device of claim 10, wherein the shaft comprises a threaded portion formed at a distal end thereof, the pivot unit further comprises a resilient member, the fastening member is screwed on the threaded portion of the shafts; the resilient member is sleeved on the shaft and sandwiched between the rotatable bracket and the fastening member for providing an axial force.

* * * * *